United States Patent
Yang et al.

(10) Patent No.: US 12,054,406 B2
(45) Date of Patent: *Aug. 6, 2024

(54) IN SITU OIL CLEANUP AND RECOVERY USING SMART POLYMER INTEGRATED SURFACE VESSELS

(71) Applicant: THE TRUSTEES OF THE STEVENS INSTITUTE OF TECHNOLOGY, Hoboken, NJ (US)

(72) Inventors: Eui-Hyeok Yang, Fort Lee, NJ (US); Jian Xu, West Lafayette, IN (US); Wei Xu, Farmingdale, NY (US); Brendan Englot, New York, NY (US); Chang-Hwan Choi, Tenafly, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,406

(22) Filed: Aug. 4, 2022

(65) Prior Publication Data

US 2023/0025974 A1   Jan. 26, 2023

Related U.S. Application Data

(63) Continuation of application No. 16/766,066, filed as application No. PCT/US2018/063932 on Dec. 4, 2018, now Pat. No. 11,407,657.
(Continued)

(51) Int. Cl.
*C02F 1/40* (2023.01)
*C02F 1/28* (2023.01)
(Continued)

(52) U.S. Cl.
CPC ............. *C02F 1/40* (2013.01); *C02F 1/285* (2013.01); *B82Y 30/00* (2013.01);
(Continued)

(58) Field of Classification Search
CPC .. C02F 1/40; C02F 1/285; C02F 1/288; C02F 1/28; C02F 1/46104; C02F 2101/32;
(Continued)

(56) References Cited

U.S. PATENT DOCUMENTS

2011/0303531 A1* 12/2011 Hunter ................. H01B 1/127
                                                                 204/242
2012/0000856 A1*  1/2012 Yancy ............... B01J 20/28033
                                                                 210/671
2022/0177331 A1   6/2022 Yang et al.

* cited by examiner

*Primary Examiner* — Akash K Varma
(74) *Attorney, Agent, or Firm* — Clark Hill PLC; Ralph W. Selitto; John K. Kim

(57) ABSTRACT

Smart membranes (14) are integrated into a small, unmanned surface vessel (20) to enable the efficient, automated cleanup of oil spills. Such a vessel (20) has the potential to provide a low-cost, modular solution for day-to-day oil-spill cleanup operations, especially in confined aquatic areas, such as under piers and in the small spaces between marine vessels and piers. The smart membranes (14) are provided on the surface of a conveyor belt (34) that circulates the membranes (14) through the surrounding body of water (10) for oil collection, as well as through an internal reduction chamber (22) of the vessel (20) for oil release. The smart membranes (14) are adapted to attract and repel oil (12) in response to low-voltage commands applied across the conveyor belt (34), using a process that is repeatable for a number of cycles, offering high efficiency and long durability (FIG. 5).

19 Claims, 3 Drawing Sheets

Related U.S. Application Data

(60) Provisional application No. 62/594,485, filed on Dec. 4, 2017.

(51) Int. Cl.
 *B82Y 30/00* (2011.01)
 *C02F 101/32* (2006.01)
 *C02F 103/00* (2006.01)

(52) U.S. Cl.
 CPC .... *C02F 2101/32* (2013.01); *C02F 2103/007* (2013.01); *C02F 2301/08* (2013.01); *C02F 2303/16* (2013.01); *C02F 2305/04* (2013.01); *C02F 2305/08* (2013.01)

(58) Field of Classification Search
 CPC .......... C02F 2201/008; C02F 2103/007; C02F 2103/00; C02F 2103/08; C02F 2301/08; C02F 2303/16; C02F 2305/04; C02F 2305/08; B82Y 30/00
 USPC ........................................................ 210/680
 See application file for complete search history.

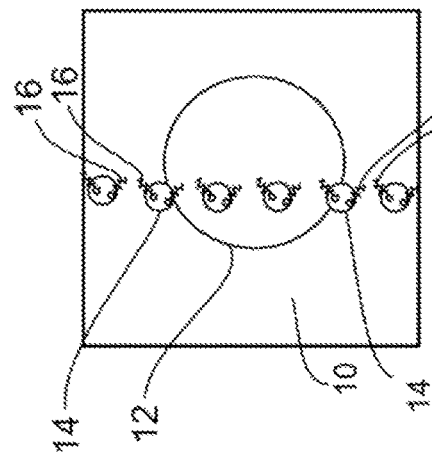
FIG. 1
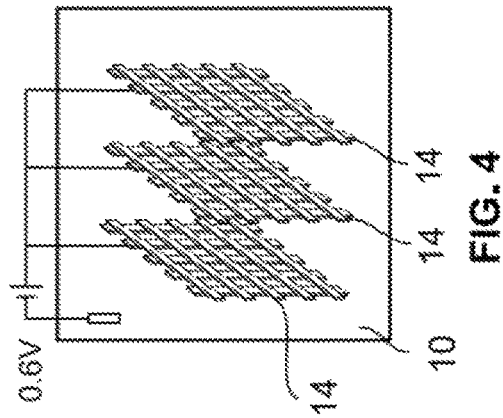
FIG. 2A
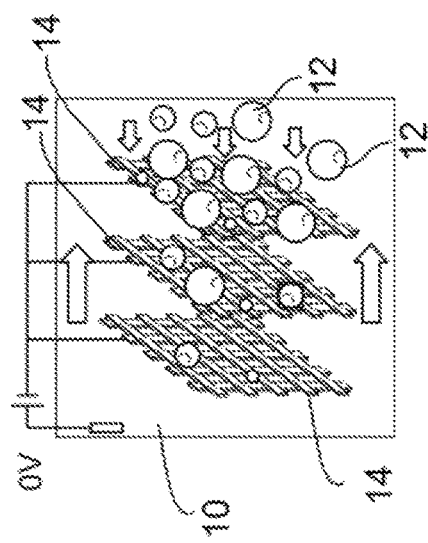
FIG. 2
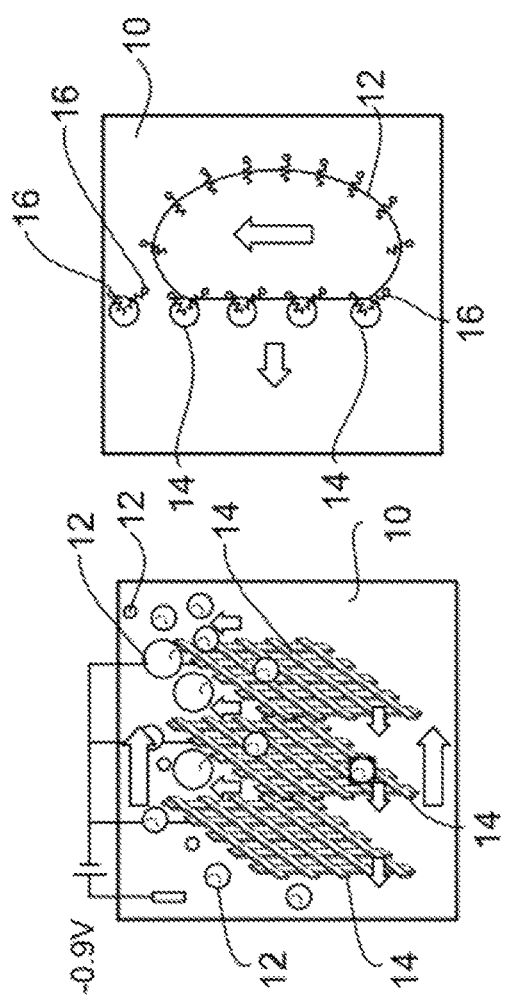
FIG. 3A
FIG. 3
FIG. 4

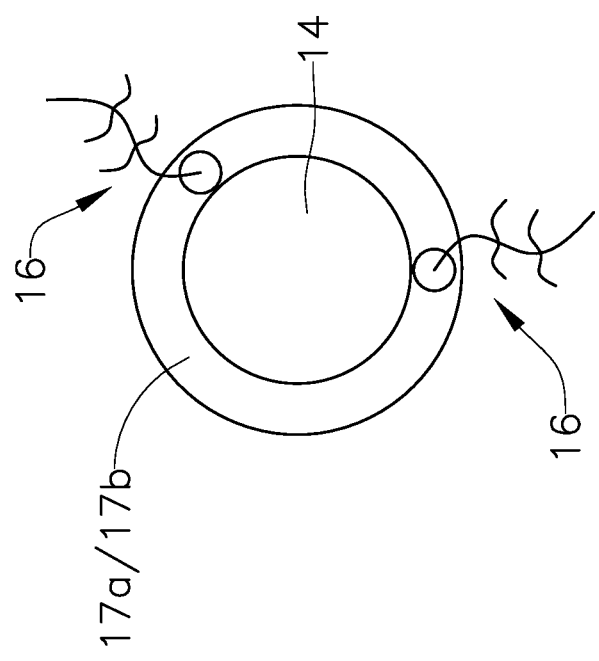

IN SITU OIL CLEANUP AND RECOVERY USING SMART POLYMER INTEGRATED SURFACE VESSELS

CROSS-REFERENCE TO RELATED APPLICATION

This is a continuation application of U.S. patent application Ser. No. 16/766,066, filed May 21, 2020, which is an application under 35 U.S.C. § 371 of International Application No. PCT/US2018/063932, filed Dec. 4, 2018 and entitled "IN SITU OIL CLEANUP AND RECOVERY USING SMART POLYMER INTEGRATED SURFACE VESSELS," which claims priority to U.S. Provisional Patent Application Ser. No. 62/594,485 filed Dec. 4, 2017, the entire disclosures of these applications are incorporated herein by reference in their entireties.

STATEMENT REGARDING FEDERALLY SPONSORED RESEARCH

This invention was made with government support under Grants ECCS-1202269 and EEC-1138244 awarded by the National Science Foundation and Grant FA9550-11-1-0272 awarded by the Defense University Research Instrumentation Program. The government has certain rights in the invention.

FIELD OF THE INVENTION

This invention relates to smart membranes, and, more particularly, to such membranes adapted for integration into a surface vessel for performing surface oil cleanup and recovery operations.

BACKGROUND OF THE INVENTION

There is persistent, day-to-day oil spillage into U.S. waterways that results from many sources outside of the petroleum industry, including nearly 6,000 barrels annually from marine vessels, more than 4,000 from coastal marine facilities, and more than 350,000 from urban runoff, comprised of leakage from road vehicles and other land-based sources. When oil is spilled into the ocean, waves, water currents, and wind force the oil slick to drift over larger areas, impacting the open ocean, coastal areas, and marine/terrestrial habitats in the path of the drift.

Current technologies for oil cleanup can be divided into four categories: 1) chemical methods (dispersants, solidifiers), 2) in situ burning, 3) bioremediation, and 4) mechanical recovery (booms, skimmers, and sorbents). Although some of these technologies perform well in certain applications depending on the oil's characteristics and the type of environment involved, they usually have very high material costs and sometimes have adverse effects on the environment. For example, while sorbents can trap spilled oil efficiently, they suffer from the problem of saturation.

In many ports and harbors, preventative measures are employed to minimize the impact of a potential spill. One of the most commonly used measures is pre-booming, the practice of deploying an oil boom in advance, to contain any potential spillage for easy skimming and disposal. When pre-booming is not possible due to space constraints, response vessels equipped with booms are often on standby. However, even when booms can be deployed effectively, not all areas within the boom are easily reached by a skimmer, which pumps oily water via a hose to the shore or to a larger vessel.

SUMMARY OF THE INVENTION

In one aspect, the present invention is directed to a membrane adapted for use as an oil collection apparatus. An exposed surface of the membrane includes a conjugated polymer that functions to promote the collection of oil on the exposed surface of the membrane when the conjugated polymer is oxidized. When the conjugated polymer is reduced, it functions to release oil from the exposed surface of the membrane.

The aforementioned oxidation and reduction of the conjugated polymer can be performed electrochemically, for example. Electrochemical oxidation can be performed by applying a positive voltage to the conjugated polymer, while electrochemical reduction can be performed by applying a negative voltage to the conjugated polymer. The positive electric voltage can lie in a range of from greater than 0 to about 1.5 volts, while the negative electric voltage can lie in a range of from about −0.6 to about −1.5 volts.

In an embodiment, the membrane possesses a wettability characteristic that can be varied in response to the voltage applied to the conjugated polymer during oxidation and reduction. In an embodiment, the conjugated polymer can be dodecylbenzenesulfonate-doped polypyrrole. In an embodiment, the conjugated polymer is a surfactant-doped conjugated polymer film. Alternatively, the conjugated polymer can be a freestanding, porous film fabricated via 3 D printing of the conjugated polymer.

The membrane can also include a substrate cooperating with the conjugated polymer to form a composite structure. In an embodiment, the substrate can be a stainless steel mesh. The stainless steel mesh can further include carbon nanotubes grown thereon via chemical vapor deposition. In embodiments in which carbon nanotubes are used, the conjugated polymer may be coated on the carbon nanotubes via electropolymerization.

In another embodiment, the substrate can include an electrically conductive carbon foam having a porous 3D structure. In such an embodiment, the conjugated polymer would be applied to the substrate so that the conjugated polymer inherits the porosity of the conductive carbon foam.

In accordance with another aspect of the present invention, the membrane can be incorporated in a surface vessel for in situ oil clean-up of, and recovery from, a body of oil-contaminated water. The vessel can include a reduction chamber with a first reservoir of electrolyte and a first set of electrodes designed to generate a negative electric voltage. The vessel may also include an oxidation chamber with a second reservoir of electrolyte and a second set of electrodes designed to generate a positive electric voltage. A conveyor belt, which includes the aforementioned membrane and a plurality of similar membranes, can be employed in connection with an inventive method which involves the steps of: (1) passing the membranes, while in an oxidized state, through a body of oil-contaminated water to collect oil; (2) passing the membranes, with collected oil thereon, through the first reservoir of electrolyte in the reduction chamber to reduce the membranes and thereby release collected oil therefrom; and (3) then passing the membranes through the second reservoir of electrolyte in the oxidation chamber to oxidize the membranes and thereby regenerate the membranes for reuse as oil-collection agents.

The membranes carried by the conveyor belt can be electrochemically reduced by applying a negative electric voltage to the first set of electrodes as the conveyor belt carries the membranes through the first reservoir of electrolyte in the reduction chamber, thereby releasing collected oil into the first reservoir of electrolyte. When the conveyor belt carries the membranes from the reduction chamber to the oxidation chamber, the membranes are then electrochemically oxidized as a result of a positive electric voltage applied by the first set of electrodes, whereby surface regeneration of the membranes is effected in preparation for their reuse as oil-collection agents.

In an embodiment, the first reservoir of electrolyte in the reduction chamber and the second reservoir of electrolyte in the oxidation chamber are separated by a partition positioned between the oxidation chamber and the reduction chamber. The partition inhibits oil collected in the reduction chamber from migrating into the oxidation chamber.

Unlike the existing technologies listed in the background section hereinabove, the present invention involves the utilization of smart membranes that may be combined with a conveyor belt in a small-scale, oil-cleaning surface robot adapted to access oil spills in confined areas, such as under piers and in the small spaces between vessels and piers. In an embodiment, the smart membranes comprise: (1) conjugated polymer (e.g., dodecylbenzenesulfonate-doped polypyrrole, abbreviated as PPy(DBS)); (2) carbon nanotubes (CNTs); and (3) stainless steel (SS) mesh.

The present invention provides a potential low-cost, modular solution for day-to-day oil-spill cleanup operations in confined aquatic areas, such as those described above. Unlike current cleanup solutions, such as skimmers, which pump large volumes of oily water by hose into storage barges, the present invention incorporates smart membrane surfaces into a small, untethered automated surface vessel, enabling efficient and continuous collection of oil from the surface of a body of water. In addition to providing a solution for accessing oil spills in confined areas, a small-scale, oil-cleaning surface robot may also serve as a countermeasure for rapid water clean-up, especially in situations where a boom cannot be deployed, as such a robot can patrol the area in the vicinity of a fuel transfer.

In an embodiment, the smart membranes of the present invention exhibit tunable wettability, in the form of in situ switching of underwater wettability (i.e., affinity for organic liquid in an aqueous environment), as an oil collection agent. When electrochemically oxidized (by applying a positive voltage to the conjugated polymer), the membranes' surface has strong adhesion to oil, thereby allowing the membranes to collect oil. When reduced (by applying a negative voltage to the conjugated polymer), the membranes' surface releases the trapped oil into, for example, an interior reservoir of a surface vessel. The conjugated polymer (e.g., PPy(DBS)) switches its underwater wettability in situ upon application of voltages as low as ±1 V. When a positive electric voltage (e.g., 0.1 V) is applied, the PPy(DBS) surface is oxidized with a strong adhesion toward oils. As a result, the membranes can adsorb oils by adhering the oils on their PPy(DBS) surface. When a negative electric voltage (e.g., −0.9 V) is applied, the PPy(DBS) surface is reduced, whereby previously attached oil droplets can roll off the membranes or permeate through the membranes' mesh.

The process described above can be actuated using very low voltages (<1 V) and is repeatable for a number (e.g., hundreds) of cycles, thereby resulting in high efficiency and long durability. Furthermore, as the smart membranes of the present invention can be incorporated into a conveyor belt that runs along the exterior hull of a small unmanned surface vessel, the present invention is also directed to a method which allows the aforementioned oil collection process to be automated. Altogether, the various aspects and embodiments of the present invention enable a versatile, highly efficient, fully-automatic oil cleanup and recovery technology.

BRIEF DESCRIPTION OF THE DRAWINGS

For a better understanding of the present invention, reference is made to the following detailed description of various exemplary embodiments considered in conjunction with the accompanying drawings, in which like structures are referred to by the like reference numerals throughout the several views, and in which:

FIG. 1 is a schematic illustration of a body of oil-contaminated water;

FIG. 2 is a schematic illustration of a plurality of oxidized polymer mesh membranes constructed in accordance with an embodiment of the present invention and operating to collect oil as a conveyor transports the membranes through the body of oil-contaminated water shown in FIG. 1;

FIG. 2A is a detailed schematic illustration showing an oil droplet adhered to the oxidized polymer surface of one of the mesh membranes illustrated in FIG. 2;

FIG. 2B is an alternate view of the schematic illustration of FIG. 2A, showing a close-up view of the mesh membrane;

FIG. 3 is a schematic illustration showing the polymer mesh membranes of FIG. 2 in a reduced stated in which collected oil is being released therefrom and therethrough;

FIG. 3A is a detailed schematic illustration showing an oil droplet being released from (e.g., by sliding or permeating) the reduced polymer surface of one of the mesh membranes illustrated in FIG. 3;

FIG. 4 is a schematic illustration showing the polymer mesh membranes of FIG. 3 in an oxidized state and ready for reuse after they have been regenerated;

DETAILED DESCRIPTION OF EXEMPLARY EMBODIMENTS

Figures 5, 6:
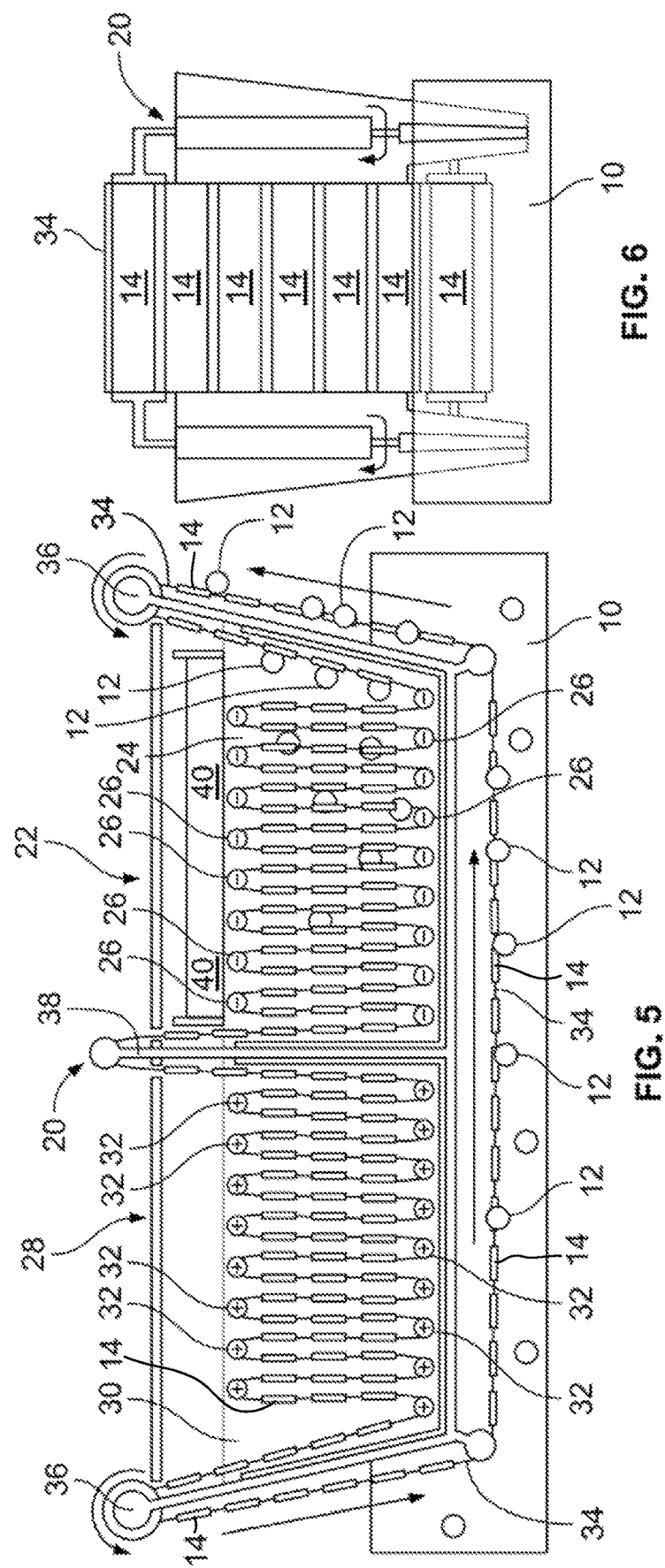
FIG. 5 is a schematic illustration of an oil-cleaning surface vessel constructed in accordance with an embodiment of the present invention and showing the vessel's oxidation and reduction chambers and their interactions with a conveyor belt which comprises membranes that are similar in construction and function to those illustrated in FIGS. 2-4.
FIG. 6 is a rear schematic illustration of the surface vessel depicted in FIG. 5 showing the vessel's catamaran hull form and steering mechanism.

The following disclosure is presented to provide an illustration of the general principles of the present invention and is not meant to limit, in any way, the inventive concepts and embodiments contained herein. All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", and "the" include the plural referents unless otherwise stated. Additionally, the terms "comprises", "comprising", "includes", "including", "has" and the like, when used herein specify that certain features are present in that embodiment; however, such terms should not be interpreted to preclude the presence or addition of additional steps, operations, features, components, and/or groups thereof.

With specific reference now to the accompanying drawings, FIGS. 1-4 represent schematic illustrations of a method involving the trap-and-release of oils and the regeneration of smart membrane surfaces in accordance with one embodiment of the present invention. In FIG. 1, a body of water (e.g., seawater) 10 is contaminated with oil 12, which is shown schematically in the form of bubbles or droplets. FIG. 2 shows the oil 12 trapped within oxidized mesh membranes 14. FIG. 2A shows an oil droplet 12 adhered to the oxidized polymer surface of one of the mesh membranes 14 illustrated in FIG. 2, wherein a DBS group 16 of the polymer has its hydrophobic tail exposed. As shown in FIG. 3, reduced polymer surfaces of the membranes 14 cause collected oil droplets 12 to be released from the membranes 14 (through sliding or permeating). FIG. 3A shows an oil droplet 12 being released from (e.g., by sliding or permeating) the reduced polymer surface of one of the mesh membranes 14 illustrated in FIG. 3, wherein the DBS group 16 of the polymer has its hydrophilic head exposed. FIG. 4 shows the membranes 14 after they have been oxidized to thereby regenerate their membrane surfaces in preparation for reuse of the membranes 14 as oil collection agents.

In an embodiment, a substrate cooperates with a conjugated polymer to form a composite mesh structure. The result is a smart membrane that includes: (1) conjugated polymer; (2) CNTs; and (3) SS mesh. On the SS mesh, CNTs 17a (See FIG. 2B) are directly grown using chemical vapor deposition to form the substrate for the conjugated polymer. Finally, the surfactant-doped conjugated polymer film is coated atop the CNTs 17a using electropolymerization to complete the composite mesh structure.

In an embodiment, multiwalled carbon nanotubes (CNTs) 17a can be directly grown from 304 stainless steel (SS) meshes (Size 200×200, McMaster-Carr, Robbinsville, NJ) using atmospheric pressure chemical vapor deposition (APCVD). SS meshes were cut, rinsed, dried and then placed in the center of a 200 quartz tube in a horizontal three zone chemical vapor deposition (CVD) furnace and heated to 750° C. under the flow of 60 sccm hydrogen (H2, Praxair, Newark, NJ) and 500 sccm Argon (Ar, Praxair, Newark, NJ). Then, additional ethylene (C2H4, Praxair, Newark, NJ) was fed through the system at flow rates of 100 sccm for 7 mins for CNTs growth. Subsequently, the samples were rapidly cooled to room temperature by blowing air into the furnace.

After CNT growth, PPy(DBS) film was electropolymerized atop the CNT-covered SS mesh surface. First, 1 mL pyrrole monomer (reagent grade, 98%, Sigma-Aldrich, St. Louis, MO) was thoroughly mixed with 150 mL 0.1 mol/L sodium dodecylbenzenesulfonate (NaDBS, technical grade, Sigma-Aldrich, St. Louis, MO) solution. Then, a CNT-covered SS mesh, a saturated calomel electrode (SCE, Fisher Scientific Inc., Pittsburgh, PA), and another SS mesh (5 cm×5 cm) were submerged in the solution as the working, reference, and counter electrode, respectively. The coating of PPy(DBS) surfaces was carried out using a potentiostat (263A, Princeton Applied Research, Oak Ridge, TN) by applying 0.7 V to the working electrode (vs. SCE) and stopped once surface charge density reached 1 $C/cm^2$. Instead of CNTs, SS meshes were deposited with 10 nm chromium (Cr) and 30 nm gold (Au) films using an e-beam evaporator (Explorer 14, Denton Vacuum, Moorestown, NJ), and then also coated with PPy(DBS) surfaces. After fabrication, the PPy(DBS) mesh surfaces were rinsed and dried in air overnight before any further characterizations.

It should be noted that CNTs are optional in the foregoing embodiment. However, the CNTs are preferred, as the in situ switch time decreases because the CNTs allow for a higher surface area, which increases the amount of DBS molecules desorbed from PPy(DBS) surfaces under reduction, thereby facilitating more rapid decrease of oil/water interfacial tension and retention force.

In another embodiment, a conductive carbon foam 17b can be used directly for PPy(DBS) electropolymerization after necessary cutting and dicing (See FIG. 2B). The pristine carbon foam 17b is extremely porous and has a 3D microstructure. It is also lightweight. The 2.5×0.5×0.2 cm carbon foam weighs only 0.025 g, compared to a 2×3 cm PPy(DBS) mesh, which weighs 0.2 g. After PPy(DBS) electropolymerization, the whole surface of carbon foam 17b can be evenly and uniformly covered with PPy(DBS) surfaces. Results show that the PPy(DBS) surface inherits the 3D porous structure of the carbon foam 17b without blocking the pores. In testing conductive carbon foam as a substrate for PPy(DBS) electropolymerization, results further show that the resulting PPy(DBS) foam exhibits much higher absorbing capacity compared with the PPy(DBS) mesh. To summarize, the PPy(DBS) foam had 3 times more absorption capacity with only ⅒ of the weight, versus the PPy(DBS) mesh. Such higher absorption capacity is attributed to the abundant surface area in the 3D porous structure of the foam 17b. By fabricating PPy(DBS) surfaces on conductive carbon foam, the absorption capacity of absorbent made of PPy(DBS) material significantly increases.

The PPy(DBS) foam's longevity was tested, and it still absorbed and released DCM oil after 100 redox cycles. Additionally, the foam proved in tests its ability to absorb and release hexane and diesel. Such 3D printed PPy(DBS) has the potential for further improving the absorbing capacity and tailoring absorbent structure for different oil cleanup scenarios, as well as the development of other applications using PPy(DBS) surfaces and its wettability characteristic that can be varied in response to changing parameters (i.e., tunable wettability).

In another embodiment, 3D printing is used to directly print PPy(DBS) materials with a 3D porous structure to form PPy(DBS) absorbents. In this way, the structure and physical/mechanical properties of PPy(DBS) absorbents can be tailored and the mass production of PPy(DBS) absorbents will be possible. In order to test the feasibility of 3D printing of PPy(DBS), the PPy(DBS) solution was prepared and later cast on flat substrates (i.e., glass slides, Au-coated Si) to form freestanding PPy(DBS) films. Then, the resulting freestanding PPy(DBS) films were tested for their tunable wettability and switchable adhesion toward oils.

To prepare the PPy(DBS) solution, PPy(DBS) surfaces must be dissolved in organic solvents. However, it is suggested that electropolymerized PPy(DBS) is insoluble in either organic or inorganic solvents due to its high degree of cross-linking. Thus, electrochemical oxidization is used instead to prepare PPy(DBS) material, in which the polymerization is started by adding oxidants (e.g., iron(III) chloride, $FeCl_3$) into the solution with pyrrole monomer and NaDBS.

With careful controlling of the molecular ratio/concentration of pyrrole/NaDBS/$FeCl_3$ and the polymerization duration, PPy(DBS) particles were synthesized and precipitated, which were then filtered out and thoroughly rinsed and dried. For example, 0.5 mL (0.0075 mL) of pyrrole monomer was mixed with 75 mL of 0.1 mol/L NaDBS solution for one hour. Then, 5 mL of 0.25 mol/L $FeCl_3$ solution was added dropwise to start the polymerization process. After 10 minutes, the precipitates were filtered out using centrifugation, washed extensively with water three times, and dried in air at 60° C. for 72 hours. Subsequently, the PPy(DBS) particles were dissolved in dimethylformamide (DMF) to form a stable suspension. To test the tunable wettability of PPy(DBS) made from electrochemical oxidization, one drop of such suspension was applied on a glass slide and dried overnight to form a freestanding film. The resulting PPy (DBS) freestanding film was then tested for tunable wettability.

This initial result suggests that the PPy(DBS) films made by a casting PPy(DBS) particle solution also exhibit tunable wettability, demonstrating the feasibility of making an oil absorbent via the 3D printing of PPy(DBS). Thus, with a careful design of the structure based on the oil cleanup requirement, the PPy(DBS) oil absorbent can be fabricated using 3D printing. Such oil absorbent can have both high absorbing capacity, as well as in situ surface regeneration ability, making it suitable for highly efficient next generation oil cleanup technology.

By way of example, DCM droplets on freestanding PPy (DBS) surfaces are characterized by a spherical shape and contact angle of ~60° when no voltage was applied to the surface. However, when –0.9V was applied, the DCM droplet exhibited flattening behavior, similar to the shape change observed in those droplets on the reduced electropolymerized PPy(DBS) surface. A DCM droplet once adhered to the oxidized PPy(DBS) surface rolled away after 60 seconds of reduction, demonstrating tunable adhesion.

Any of the smart membranes described hereinabove can be incorporated into an unmanned, robotic surface vessel adapted for oil cleaning and recovery from a body of oil-contaminated water. For purposes of discussion only, the membranes 14 will be described in connection with one practical, potentially commercial embodiment of such a vessel 20, which is shown schematically in FIGS. 5 and 6.

With particular reference now to FIGS. 5 and 6, the vessel 20 includes a reduction chamber 22 with a reservoir 24 of electrolyte and a plurality of electrodes 26 in the form of passive rollers having a negative electric voltage. The vessel 20 also includes an oxidation chamber 28 with a reservoir 30 of electrolyte and a plurality of electrodes 32 in the form of passive rollers having a positive electric voltage.

A conveyor belt 34 includes a plurality of the smart membranes 14, which are spaced apart and electrically insulated from one another along the entire length of the conveyor belt 34. Active (i.e., driven) rollers 36 function as motive means for assisting in the performance of a method which includes the following steps: (i) passing the oxidized membranes 14 through the body of oil-contaminated water 10, where the lowest submerged portion of the membranes' surface (stable in the oxidized state) collects oil droplets 12 from the body of water 10; (ii) passing the membranes 14 through the reservoir 24 of electrolyte in the reduction chamber 22, where the membranes 14 are electrochemically reduced to thereby release collected oil droplets 12 with an assist from the simultaneous application of a dynamic pressure; and (iii) passing the membranes 14 through the reservoir 30 of electrolyte in the oxidation chamber 28, where the membranes 14 are oxidized to thereby regenerate them for reuse as oil-collection agents when they are subsequently passed back into the body of oil-contaminated water 10.

In connection with the performance of the aforementioned method, the membranes 14 can be reduced in the reduction chamber 22 by applying a negative voltage (e.g., –0.9 volts) to the rollers/electrodes 26 versus a 13 mm×35 mm platinum (Pt) mesh (i.e., counter-electrode). The subsequent oxidation of the membranes 14 can be achieved by applying a positive voltage (e.g., 0.1 volt) to the rollers/electrodes 32 versus a 13 mm×35 mm platinum (Pt) mesh (i.e., counter-electrode).

A partition 38 between the reduction chamber 22 and the oxidation chamber 28 electrically insulates the two chambers from each other so that the requisite and appropriate negative and positive voltages may be applied to the membranes 14 as they pass between the reduction chamber 22 and the oxidation chamber 28, respectively. The partition 38 also creates a physical barrier that inhibits collected oil 40 in the reduction chamber 22 from migrating to the oxidation chamber 28. The collected oil 40 may be cleaned in the reduction chamber 22 to thereby avoid re-contaminating the body of water 10 outside the vessel 20.

The rollers/electrodes 26, 32 are arranged inside the reduction and oxidation chambers, 22, 28 respectively, so as to maximize the amount of collected oil 40 housed within the vessel 20. The rollers/electrodes 26, 32 also serve to support the conveyor belt 34 as it passes through the reduction and oxidation chambers 22, 28, respectively.

In addition to the active rollers 36, which function as motive means (i.e., a drive system) for the conveyor belt 34, the vessel 20 includes a simple electric propulsion system (not shown), an onboard microcontroller (not shown) supporting remote control of the drive and propulsion systems, and a lithium polymer battery (not shown). The vessel 20 is designed to be sufficiently positively buoyant to take on additional weight during the performance of an oil-collection operation.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

The invention claimed is:

1. A membrane adapted for use as an oil-collection agent, said membrane comprising a substrate, which includes a stainless steel mesh and carbon nanotubes covering said stainless steel mesh; and a conjugated polymer applied to said substrate and cooperating therewith to form a composite structure having an exposed surface, which includes said conjugated polymer, wherein said conjugated polymer has a capability of functioning (i) to collect oil on said exposed surface of said composite structure when said conjugated polymer is oxidized in response to an immersion of said membrane in a first external source of liquid electrolyte, which includes a first voltage source, and (ii) to release the oil from said exposed surface of said composite structure when said conjugated polymer is reduced in response to the immersion of said membrane in a second external source of liquid electrolyte, which includes a second voltage source.

2. The membrane of claim 1, wherein said membrane is combined with conveyor means for conveying said membrane to and from the first and second external sources of liquid electrolyte.

3. The membrane of claim 2, wherein said conveyor means includes a conveyor belt.

4. The membrane of claim 3, wherein said conveyor belt is provided on an unmanned, robotic surface vessel.

5. The membrane of claim 1, wherein said conjugated polymer is capable of being electrochemically oxidized by applying a positive electric voltage to said conjugated polymer and wherein said conjugated polymer is capable of being electrochemically reduced by applying a negative electric voltage to said conjugated polymer.

6. The membrane of claim 5, wherein said positive electric voltage lies in a range of from greater than 0 volts to about 1.5 volts and wherein said negative electric voltage lies in a range of from about −0.6 volts to about −1.5 volts.

7. The membrane of claim 6, wherein said conjugated polymer exhibits a wettability characteristic variable in response to the voltages selected from said positive and negative electric voltage ranges.

8. The membrane of claim 1, wherein said conjugated polymer is a surfactant-doped conjugated polymer film.

9. The membrane of claim 1, wherein said conjugated polymer is dodecylbenzenesulfonate-doped polypyrrole.

10. The membrane of claim 1, wherein said conjugated polymer is a freestanding, porous film.

11. The membrane of claim 10, wherein said freestanding, porous film is fabricated via 3D printing of said conjugated polymer.

12. The membrane of claim 1, wherein said carbon nanotubes are grown on said stainless steel mesh via chemical vapor deposition.

13. The membrane of claim 12, wherein said conjugated polymer is coated on said carbon nanotubes via electropolymerization.

14. A membrane adapted for use as an oil-collection agent, said membrane comprising a substrate, which includes an electrically conductive carbon foam; and a conjugated polymer applied to said substrate and cooperating with said substrate to form a composite structure having an exposed surface, which includes said conjugated polymer, wherein said conjugated polymer has a capability of functioning (i) to collect oil on said exposed surface of said composite structure when said conjugated polymer is oxidized in response to an immersion of said membrane in a first external source of liquid electrolyte, which includes a first voltage source, and (ii) to release the oil from said exposed surface of said composite structure when said conjugated polymer is reduced in response to the immersion of said membrane in a second external source of liquid electrolyte which includes a second voltage source.

15. The membrane of claim 14, wherein said electrically conductive carbon foam has a 3D porous structure.

16. The membrane of claim 15, wherein the conjugated polymer inherits said 3D porous structure of said electrically conductive carbon foam.

17. The membrane of claim 14, wherein said membrane is combined with conveyor means for conveying said membrane to and from the first and second external sources of liquid electrolyte.

18. The membrane of claim 17, wherein said conveyor means includes a conveyor belt.

19. The membrane of claim 18, wherein said conveyor belt is provided on an unmanned, robotic surface vessel.

* * * * *